United States Patent [19]

Thompson, Jr.

[11] Patent Number: 5,236,199
[45] Date of Patent: Aug. 17, 1993

[54] INTERACTIVE MEDIA SYSTEM AND TELECOMPUTING METHOD USING TELEPHONE KEYPAD SIGNALLING

[76] Inventor: John W. Thompson, Jr., 7890 Hampton Village Pass, Annandale, Va. 22003

[21] Appl. No.: 714,951

[22] Filed: Jun. 13, 1991

[51] Int. Cl.⁵ .......................... A63F 9/22; A63F 9/24; H04H 1/02; H04M 11/08
[52] U.S. Cl. .................................... 273/439; 273/433; 273/DIG. 28; 455/4.2; 358/85; 379/90; 379/98; 340/709
[58] Field of Search ............... 273/DIG. 28, 434, 433, 273/438, 439, 148 B; 379/90, 92, 102, 98; 358/903, 84, 85, 86, 125; 340/709; 455/2, 4.1, 4.2, 5.1; 364/410

[56] References Cited

U.S. PATENT DOCUMENTS

| | | | |
|---|---|---|---|
| 4,372,558 | 2/1983 | Shimamoto et al. | 273/238 |
| 4,570,930 | 2/1986 | Matheson | 273/439 |
| 5,014,125 | 5/1991 | Pocock et al. | 358/86 |

FOREIGN PATENT DOCUMENTS

| | | | |
|---|---|---|---|
| 2455085 | 5/1976 | Fed. Rep. of Germany | 273/439 |
| 2-295338 | 12/1990 | Japan | 273/439 |
| 2136303 | 9/1984 | United Kingdom | 273/434 |

Primary Examiner—Jessica Harrison
Attorney, Agent, or Firm—Lowe, Price, LeBlanc & Becker

[57] ABSTRACT

Telephone DTMF keypad signalling is converted to a unique user input protocol in conjunction with interactive media and telecomputing network systems to permit one or more participants to provide directional, triggering, and other input to computer or computer controlled systems with telephone keypads or like devices as if using a computer system mouse, joystick, keyboard, or similar input device. Such utilization of readily available push-button telephones as a participant's computer input device, permits user interaction with computer generated, influenced, or controlled video programming, databases, and applications providing visual feedback over a video network.

31 Claims, 6 Drawing Sheets

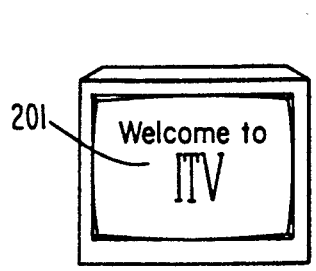
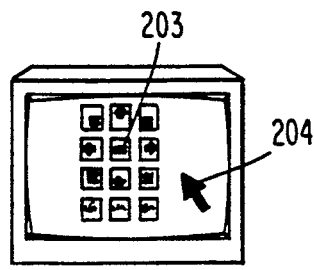
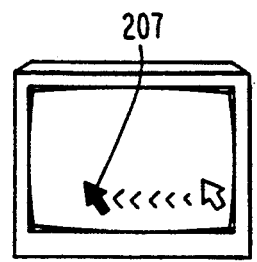
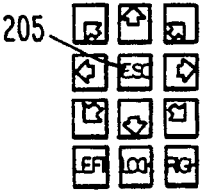
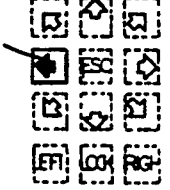
Fig. 2A  Fig. 2B  Fig. 2C
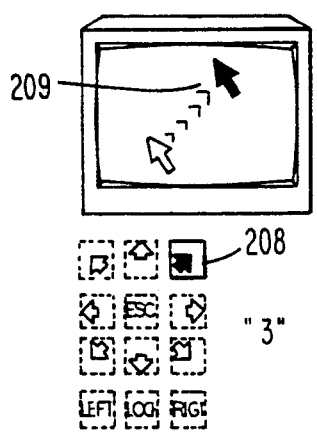
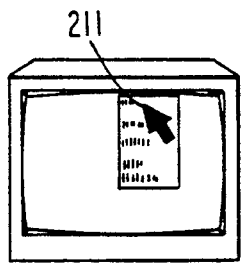
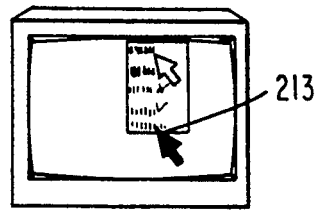
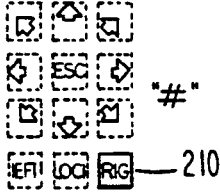
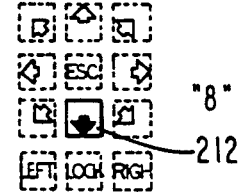
Fig. 2D  Fig. 2E  Fig. 2F
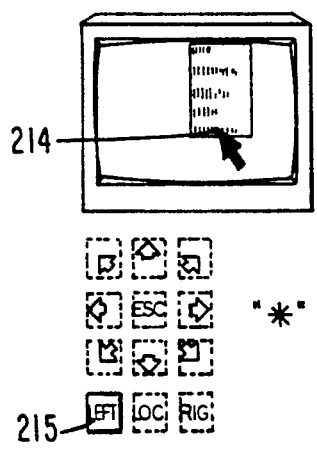
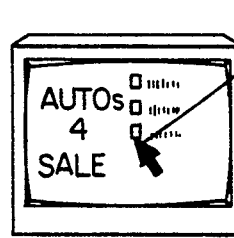
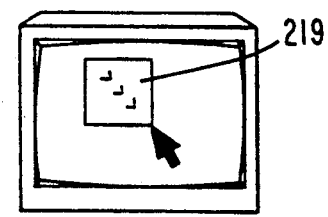
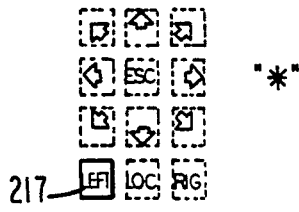
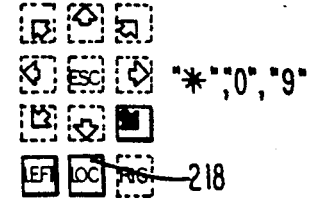
Fig. 2G  Fig. 2H  Fig. 2I

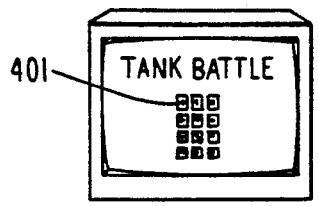
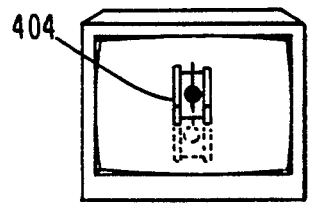
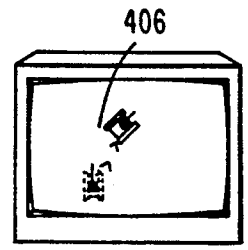
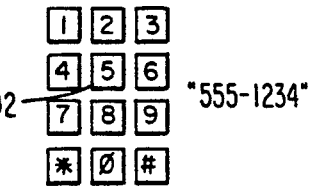
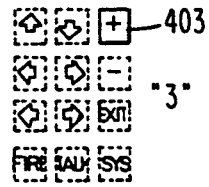
Fig. 4A  Fig. 4B  Fig. 4C
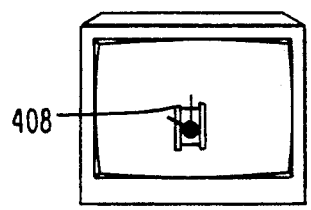
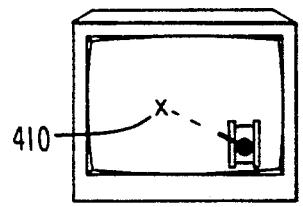
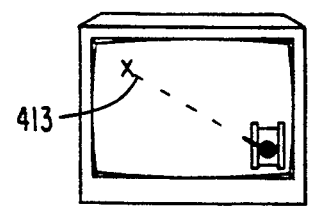
Fig. 4D  Fig. 4E  Fig. 4F
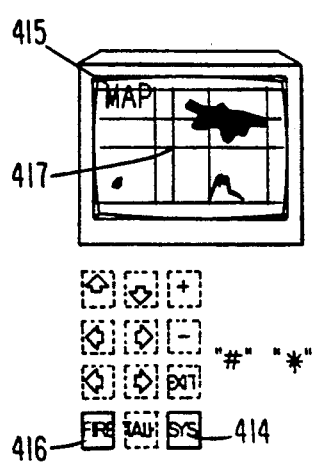
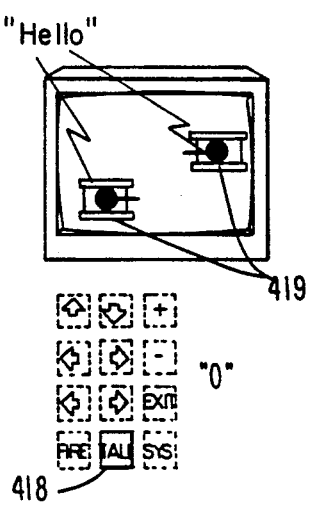
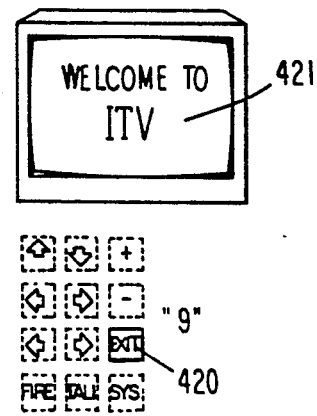
Fig. 4G  Fig. 4H  Fig. 4I

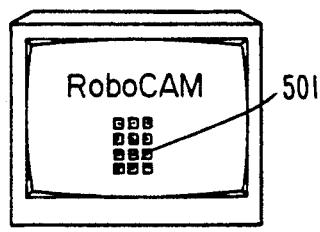
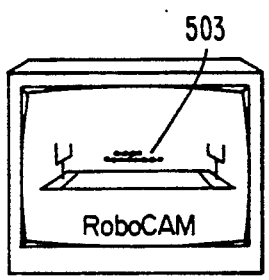
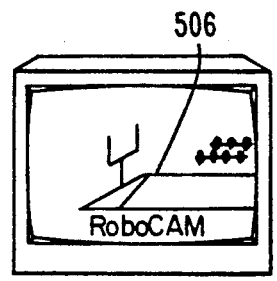
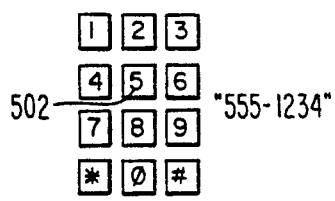
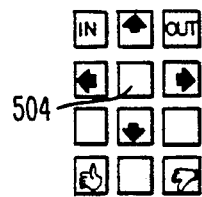
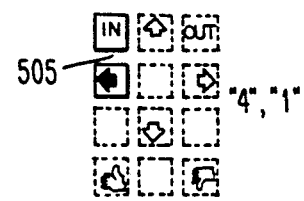
Fig. 5A
Fig. 5B
Fig. 5C
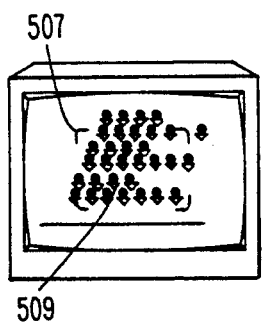
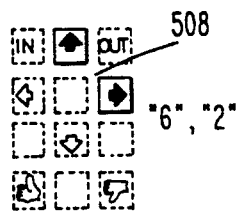
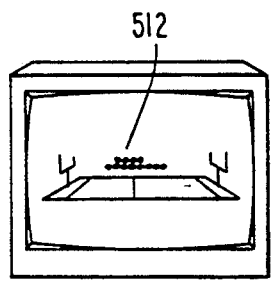
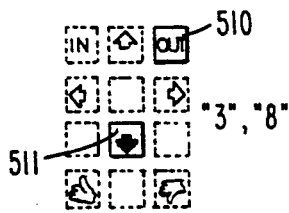
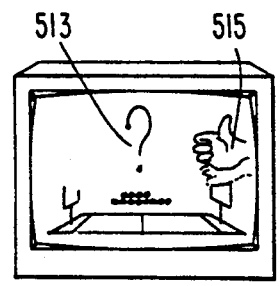
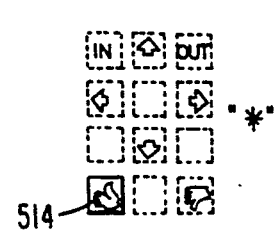
Fig. 5D
Fig. 5E
Fig. 5F

INTERACTIVE MEDIA SYSTEM AND TELECOMPUTING METHOD USING TELEPHONE KEYPAD SIGNALLING

TECHNICAL FIELD

The present invention relates generally to audience participation in computer generated, influenced, or controlled video programs and user interaction with on-line computer databases. More particularly the invention relates to user use of telephone keypads to generate signalling.

BACKGROUND ART

Advances in computer and communications technology are contributing to the feasibility of a new mass audience medium sometimes referred to as "interactive" or "audience participatory" TV. However, an economically feasible participant input method is needed in order to facilitate the growth of such a mass medium. It is uneconomical to deploy a computer-based appliance in every household. However, as the number of available video channels increases with advances in cable TV, with video compression techniques for low bandwidth video, and with the prospect of high bandwidth multiple channel fiber optic cable to the home, eventually every household could have remote access to computer services and new forms of interactive video entertainment. The present invention is intended to provide access to such interactive multimedia and telecomputing services without requiring user ownership or possession of a computer system.

DESCRIPTION OF THE PRIOR ART

Prior practices for interacting with stored computer programs generally involves user use of a computer system comprising a personal computer, work station, or terminal equipped with an input device, such as a keyboard, mouse, or joystick for controlling directional pointer/cursor/sprite movement or triggering events. For remote access to other similar systems, computer-based methods utilize a direct connection, modem or PAD to transmit input telemetry and receive feedback over an analog or digital data network with the user's computer monitor providing the visual display. These methods, including those generally referred to as videotex and teletex, restrict the number of potential participants to only those that possess or have access to a compatible user computer system equipped with a data network device and communications software.

The most common method of using telephone keypad signalling to remotely access a computer system and online database is called an audio response or audiotex system. The problem with such systems is that the user is generally limited to navigating through a data base or program choices only through branching menu selections such as "Press 1 for this audio response, press 2 for that audio response, etc." More significantly, the user receives only audio responses with no visual feedback or display.

DISCLOSURE OF THE INVENTION

It is a primary object of the present invention to provide a method by which users may send directional, triggering, and other input to computers with telephone keypad signalling and receive visual feedback and displays relating to that input. The participants, either on demand or as interactive network subscribers, must first select on their VTS system an available video channel presenting interactive programming and establish a telephone circuit to the appropriate protocol conversion system associated with the selected video channel.

A predetermined directional and triggering interpretation protocol, the user's options and instructions may be presented to the user audiovisually via the video channel. The basic steps in the process are as follows: (1) as the user generates the various telephone keypad signals, these events are (2) transmitted over a telephone network to the protocol conversion system. (3) The protocol converter validates these entries and acts on the input per predetermined telephone keypad signalling interpretation protocols, its programmed instructions or script, thereby influencing (4) the protocol converter's output of user directional, triggering, and other control data for onscreen visuals to (5) a multimedia program computer that acts on such input in accord with its stored instructions for generating external or peripheral device control data and computer graphics, pointer/cursor and sprite images that are (6) converted by a video encoder into video signals to be delivered to (7) the video transmitter that then delivers audio/visual feedback to the user via the selected video network delivery channel, thereby completing the process from user input to visual output.

BRIEF DESCRIPTION OF DRAWINGS

The foregoing and other objects, aspects and advantages of the invention will be better understood from the following drawings in which:

FIGS. 2A–I illustrate a user's perspective of the keyboard and display in a mouse mode;

FIGS. 4A–I illustrate a user's perspective of the keyboard and display in a keyboard mode; and FIGS. 5A–F illustrate a user's perspective of the invention in a robotic camera control application.

BEST MODE FOR CARRYING OUT THE INVENTION

The principal elements comprising the interactive media and telecomputing network system of the invention may be described as follows.

Figure 1:
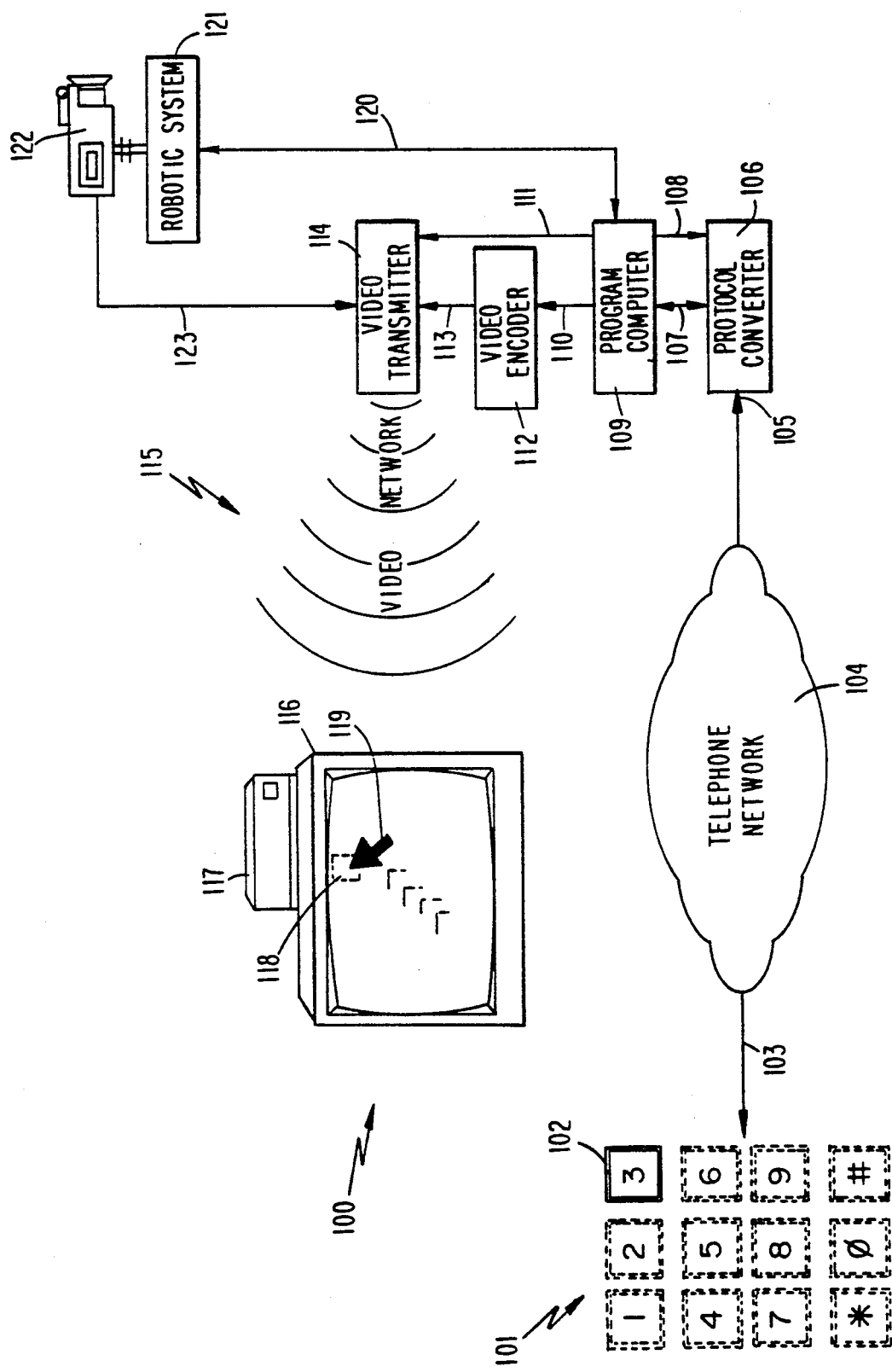
FIG. 1 is a diagrammatic illustration showing the system of the invention.

Referring to FIG. 1, a standard telephone DTMF keypad signalling unit 101 is connected via a private or public telephone network 104 to a protocol conversion system or device 106. The participant or client installation may comprise a personal computer, work station, broadcast receiving system, or other peripheral device or system with audio/voice input/output capability and dial-tone access to a telephone network, on demand or as an interactive network subscriber. This installation, indicated generally at 100, may be connected to establish a telephone circuit 103, 104, 105 to the protocol converter 106. The protocol converter accepts calls from users and performs the telephone network interface function to receive, interpret, validate, and act upon the user keypad signal input in accord with its programmed instructions or script to generate responses and data signals to a particular user keypad signal.

The primary function of the protocol conversion system 106 is to interpret the telephone keypad signalling and consolidate or concentrate the audience responses where appropriate. The protocol conversion system is basically an audio response system performing such standard functions as interfacing with the telephone and data networks, monitoring lines, DTMF detection, and the switching and control of audio responses. For various applications, the protocol conversion system may also contain voice teleconferencing bridge circuits, accommodations for call transfer to other connections (lines) or voice recognition units for converting speech to text.

The options available to the user and instructions may be presented visually in print, on televised screens or computer monitors, audibly via radio or microphone broadcasts, or via telephone network delivered messages.

Via a data connection 107, a program computer or microcomputer device 109 receives data from protocol converter 106 and may apply additional audience response consolidation as appropriate. This constitutes input for its software program that generally supports a "point and click" type user interface such as used, for example, with such commercially available computers as the Apple Macintosh, Commodore Amiga, and other computer systems supporting a graphical user interface. The program computer 109 tracks the user's current pointer, cursor, or sprite onscreen coordinates, position, or proximity to hotspot areas 118, provides administrative data 107 and computer generated audio feedback 108 to the protocol conversion system 106, and generates the resulting data for external device 121, and for control of computer graphics, including the pointer/cursor, and sprite images, such as moving the pointer 119 in a northeast direction.

The visual output signal 110 of the program computer 109 is generally in an RGB computer format compatible with computer visual display units or monitors. Therefore, as required, a video encoder 112 or genlock, when mixing with other video sources, accepts this graphic RGB data 110 and converts this signal to a video signal format 113 acceptable to the video transmitter 114. The program computer may also be data networked to other program computers, service other users and, as a multimedia system, may also have control over such peripheral devices as audio/video players, video switches or external robotic systems 121 or remotely controlled devices equipped with video camera systems 122, or otherwise providing a video feedback source.

The video transmitter 114 may be a broadcast TV station, CATV headend, satellite earth station, closed-circuit video theatre, or any other video system or device capable of transmitting the resulting audience/user influenced computer generated, influenced or controlled video programming and associated audio 111 to the participant's video receiver/display unit over video network 115, which may be an over-the-air, satellite, or cabled broadcast or switched video network. The resulting audio/video signal is received by a television receiver/video display unit 116 providing the user with the resulting audio/visual feedback. For cabled or satellite video networks, a broadcast receiver/converter or compressed video expander 117 first receives the signal. For the interactive television participants, the result of their input will directly and/or indirectly influence the multimedia program that delivers audio/visual information, feedback, and displays to the users and audience.

FIGS. 1A, 1B, 1C and 1D depict illustrative typical protocol interpretations of the telephone keypad signalling containing directional, triggering and other input elements.

Figure 1A:
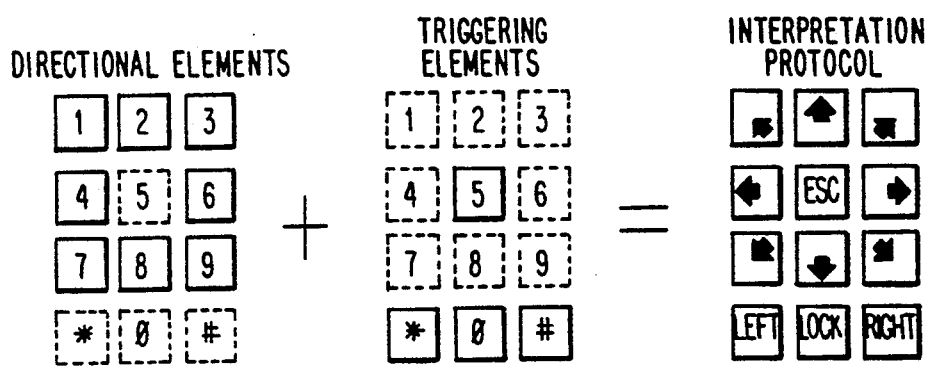
FIG. 1A is a graphic depiction of a typical interpretation of telephone keypad signalling for a mouse input mode.

FIG. 1A shows an interpretation of the telephone keypad signalling for presenting mouse input to the program computer where the 1, 2, 3, 4, 6, 7, 8, and 9 signals are the directional elements corresponding to the arrow indicators in the rightmost depiction; and the 5, *, 0, and # signals are the triggering elements corresponding to the trigger functions indicated in the rightmost depiction. The directional and triggering keys are respectively illustrated at left and center under the Directional Elements and Triggering Elements Columns.

The result of these two element sets in the signalling interpretation equals or produces a protocol that permits telephone keypad signalling to mimic the computer mouse attributes of directional movement, left and right triggering buttons, and additional functions such as escape and button lock, as shown at the right under the Interpretation Protocol Column.

Figure 1B:
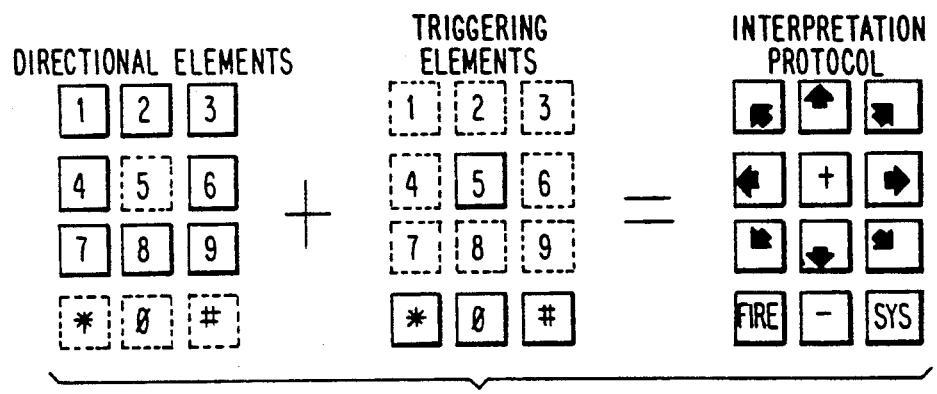
FIG. 1B is a graphic depiction of a typical interpretation of telephone keypad signalling for a joystick input mode.

Very similar to the mouse example of FIG. 1A, FIG. 1B illustrates input, for example, to a computer game requiring joystick user control. FIG. 1B shows an interpretation of the telephone keypad signalling for presenting joystick input to the program computer where the 1, 2, 3, 4, 6, 7, 8, and 9 signals are the directional elements; and the 5, *, 0, and # signals are the triggering elements. The result of these two element sets equals a protocol that permits telephone keypad signalling to mimic the computer joystick attributes of directional movement, with lower left and right triggering buttons acting as the "fire" trigger and "system select" command signals, and additional triggering functions such as "plus" and "minus" for various program actions, as shown at the right in the Interpretation Protocol Column.

Figure 1C:
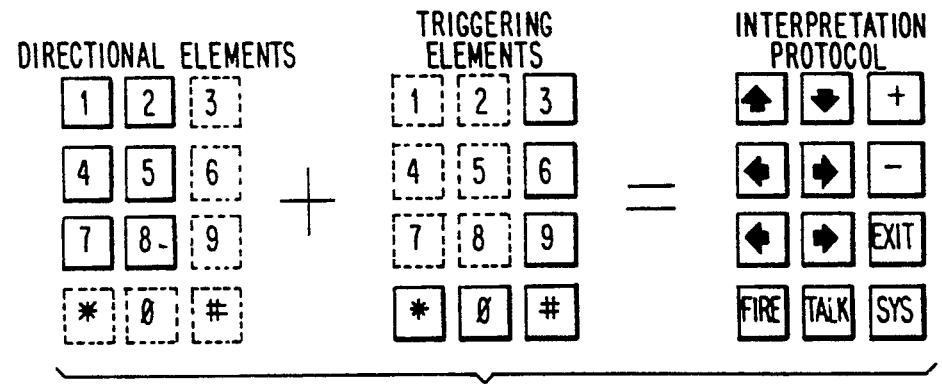
FIG. 1C is a graphic depiction of a typical interpretation of telephone keypad signalling for a keyboard input mode.

FIG. 1C shows an exemplary interpretation of telephone keypad signalling for presenting keyboard input to the program computer where the 1, 2, 4, 5, 7, and 8 signals are the directional elements; and the 3, 6, 9, *, 0, and # signals are the triggering elements. The result of these two element sets in the signalling interpretation equals a protocol that permits telephone keypad signalling to mimic the computer keyboard attributes of directional movement and various other functions such as program "exit", "fire" trigger and "system select" command signals, plus additional triggering functions such as "plus" and "minus", and "talk" for voice communications involving the user as a unique function to this computer input method, as shown in the Interpretation Protocol Column.

Figure 1D:
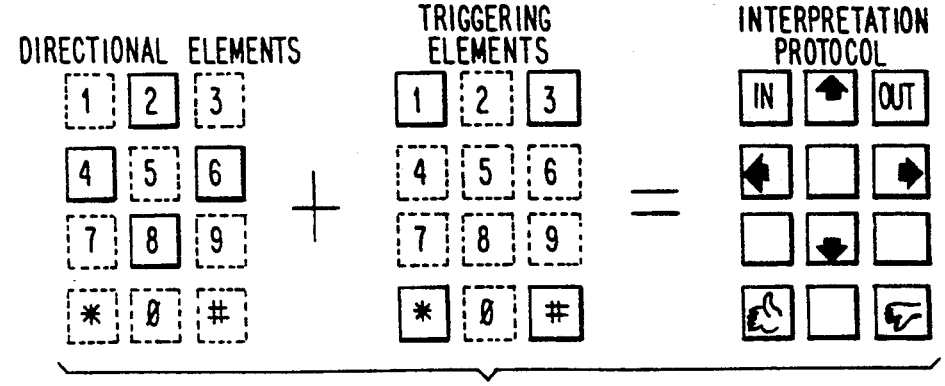
FIG. 1D is a graphic depiction of a typical interpretation of telephone keypad signalling for a robotic camera control application.

FIG. 1D shows an interpretation of the telephone keypad signalling for presenting robotic camera control input to the program computer where the 2, 4, 6, and 8 signals are the directional elements; and the 1, 3, *, and # signals are the triggering elements. The result of these two element sets in the signalling interpretation equals a protocol that permits telephone keypad signalling to mimic typical robotic camera operational attributes of pan left, right, up, and down directional movement, zoom "in" and "out" triggering buttons, and additional functions for audience polling such as "thumbs-up" and "thumbs down", as shown at the right in the Interpretation Column.

Referring to FIG. 2 there is shown at A through I how the system operates in a mouse input mode using a protocol interpretation such as shown in FIG. 1A. The user at A, having selected an available interactive channel 201 and received dial-tone, dials on the telephone keypad 202 the appropriate telephone directory number to establish a telephone network connection with the protocol converter 106 (FIG. 1). The protocol conversion system, if desired, will determine whether the call is a valid user via a variety of common methods, such as automatic number identification (ANI), credit card number entry and verification, password or account number entry, live operator, etc., and the associated database lookups.

The system as shown at FIG. 2B then informs the program computer 109 (FIG. 1) or like microcomputer device via the data channel 107 to activate a pointer 204 for the user and to track its onscreen location based on the subsequent directional commands from the user received via the protocol converter. The program computer, for example, may display a graphic on the screen 203 of the appropriate user protocol (in this case FIG. 1A) as well as any other necessary information for the user. The program computer then signals the protocol converter via the data channel 107 that it is ready to receive user input per the predetermined protocol 205 (FIG. 2B) resulting from subsequent user telephone keypad signals. The directional key signals may, in data format, represent movement as it would relate to the eight major points of the compass of North (top of the screen), South, East, West, NorthEast, SouthEast, NorthWest, and SouthWest; where 1=NW, 2=N, 3=NE, 4=W. 6=E, 7=SW, 8=S and 9=SE.

Therefore, if the user presses a key or otherwise sends a "4" keypad signal 206 (FIG. 2C), the protocol converter accepts it and sends a "MOVE WEST" data command or equivalent to the program computer. The program computer responds by moving the pointer to the left or West 207 as shown at FIG. 2C.

In the same manner the user may send a "3" keypad signal 208 at FIG. 2D to which the protocol converter would interpret and send to the program computer a "MOVE NorthEast" command, whereby the program computer moves the pointer in the NorthEast direction 209 as shown at FIG. 2D. The program computer movement of the user pointer/cursor or sprite in response to a directional signal may be determined in software by a variety of factors such as duration of the keypad signal, number of signal repetitions, etc.

The preferred embodiment of the invention comprises program computer software that emulates using a mouse as its principal source of user input in a "point and click" fashion. There are several attributes associated with this type of computer input method, one of which is "pull-down" of onscreen menus. The invention permits such an action as follows: the user directs the pointer/cursor via the directional commands as described above to the appropriate onscreen coordinates or hotspot location, usually an area at the top of the screen as indicated at 118 in FIG. 1. The program computer which has been tracking the onscreen location of the user's pointer/cursor knows whether or not the user has positioned the pointer/cursor over the desired "hot spot" 118. The hotspot may or may not be visually indicated with a graphic as shown in FIG. 1.

If the program computer receives a "menu request" command, usually triggered by a mouse user pressing the "right" mouse button, it will display a drop-down menu as shown at FIG. 2E. The invention permits such an action by the user sending the "#" keypad signal 210 to which the protocol converter sends the "right button" command to the program computer causing it to display the desired menu 211 shown in FIG. 2E.

To select an item from the program computer's menu, as illustrated at FIG. 2F, the user first positions the pointer 213 over the desired item by sending the appropriate directional signals 212.

Referring to FIG. 2G, having positioned the pointer 214, the user sends the "*" signal 215 interpreted by the protocol converter as a "left button" or "select" command with which the program computer acts based on its software. In this example, the program computer branches to the portion of its program that accesses an interactive video classifieds database of "autos for sale" as shown at FIG. 2H.

Referring to that Figure, in the same manner as above the user may position the pointer over the desired selection hotspot area 216, and press the "*" key 217, to be interpreted by the protocol converter as a "left button" or "select" trigger command causing the program computer to branch to the selected portion of its program or database.

Another attribute of typical mouse input is the ability to "drag" an image across the screen. With a mouse, this is usually accomplished by positioning the pointer to the appropriate location or hotspot, pressing the left button and holding it down while moving the mouse thereby dragging the graphic object to a new location. The keypad signalling protocol in FIG. 21 mimics this attribute by providing a trigger key function called "lock" 218 to accomplish this action. An example of this action would be to be able to draw a box on the screen of a particular size. The program computer is running the necessary software for drawing on the screen and the user selects an option that would draw a box. As with a mouse, the user first positions the pointer to the desired starting location by sending the appropriate directional signals, then sends a "*" signal to be interpreted by the protocol converter as a request to start drawing the box in the pointer's current position. The user then sends an "0" signal 218 to the protocol converter that is interpreted as a "lock" button command to be sent to the program computer as shown at FIG. 21. Then as the user sends subsequent directional commands 219, the box is drawn by the program computer as if the user were holding down a button while moving the pointer onscreen.

FIGS. 3 A through F illustrate the system operation in a joystick input mode. Essentially the operation is identical to the mouse mode with respect to directional movement, but the interpretation protocol as shown in FIG. 1B accommodates a different selection of triggering functions more consistent with the expected user inputs associated with a joystick controlled computer program. For this example, a flight simulator program is used as might be expected in a computer game program offering.

Figure 3A:
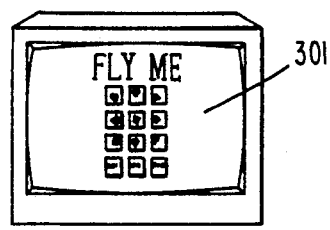
FIGS. 3A–F illustrate a user's perspective of the keyboard and display in a joystick mode.
Figure 3A:
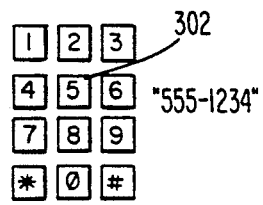
Figure 3B:
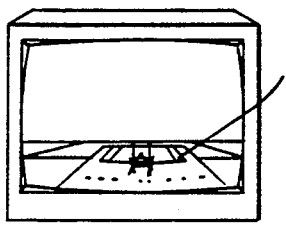
Figure 3B:
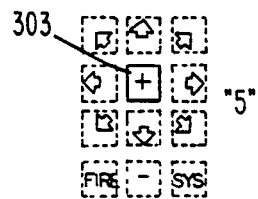

As in FIG. 2, the user must first select the appropriate video network channel 301 and establish a connection with the protocol conversion system by making a telephone call in the normal fashion 302 as shown at FIG. 3A. The program computer, having been activated as previously described to accept user input, displays the image of the jet and gives an audio or visual prompt to the user that it is ready for take-off 304 as shown at FIG. 3B. The user, having already been briefed and shown the appropriate interpretation protocol FIG. 1B, sends the "5" - telephone keypad signal 303 (FIG. 3B) that is interpreted by the protocol converter as a "+" keyboard command to be sent to the program computer. The program computer responds, for example, by accepting the command as one to add power to the jet. The program computer then moves the jet image (also known as a computer sprite) and delivers the resulting engine sound effect audio signal to the video transmitter via audio channel 111 (FIG. 1). The user sees the sprite respond to his/her command by moving and hears the engines increase in loudness 304 as power is added by sending repetitions of the "5" signal.

Figure 3C:
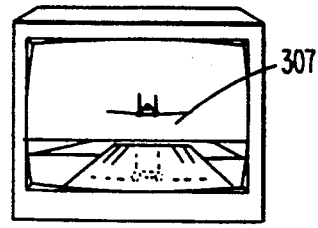
Figure 3C:
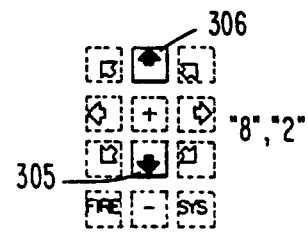
Figure 3D:
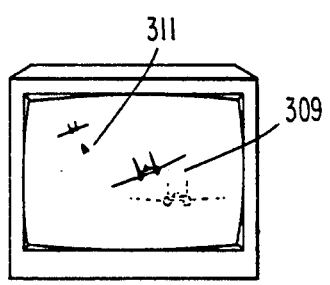
Figure 3D:
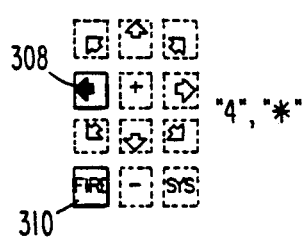
Figure 3E:
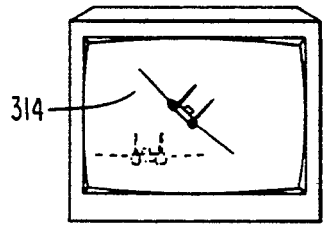
Figure 3E:
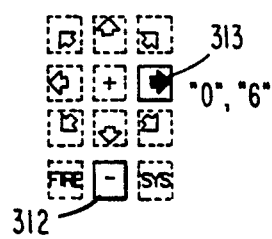
Figure 3F:
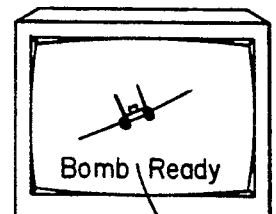
Figure 3F:
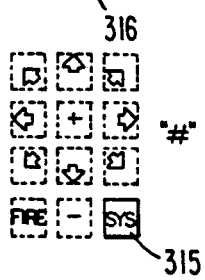

As in the mouse example, joysticks generally produce electrical signals representing directional and triggering functions. Again, the telephone keypad signalling directional element would represent the eight major points of the compass where the 1, 2, 3, 4, 6, 7, 8, and 9 keys equal the NorthWest, North, NorthEast, West, East, SouthWest, South, and SouthEast directions respectively. Joysticks usually contain one or more triggers or select buttons, and the invention accommodates that attribute with the "*" and "#" keypad signals interpreted as the "fire" and select systems options respectively. The user controls the computer sprite movement by sending directional keypad signals as shown by example 305, 306, 308, and 313 and so on per FIG. 1B mimicking joystick control of the computer sprite 307, 309 and 314 as shown in FIGS. 3C, D and E. The user controls various triggering functions by sending triggering keypad signals as shown for example at 310, 312, and 315 and so on FIGS. 3D, E and F mimicking joystick triggers resulting in onscreen results 311 and 316 as seen in those figures.

FIGS. 4 A through I illustrate operation of the invention in a keyboard mode for user input of directional and triggering commands to a program computer per the interpretation protocol shown in FIG. 1C. In this example, the directional elements are not based on the points of the compass, but on two sets of "left and right" and one set for "up and down" directions. By this example, it is intended to show that any appropriate predetermined interpretation of the telephone keypad signals may be used with the invention to provide a user with directional and triggering input capability for controlling televised computer generated screen images.

In the example of FIG. 4, the user selects the appropriate video channel 401 and has established the telephone network connection to the protocol conversion system 402, and is briefed on how to play "tank battle" using the appropriate telephone keypad signalling interpretation 401 as shown at FIG. 4A.

Referring to FIG. 4B the user controls the sprite's forward movement 404 and speed by sending the "3" keypad signal 403 interpreted by the protocol converter as a "+" data command to be sent to the program computer. Sending of the "8" keypad signal 405 via interpretation by the protocol converter and subsequent action by the program computer, turns the sprite to the right 406 as shown at FIG. 4C.

A separate set of directional elements may control the directional movement of a sub-object, in this case the tank cannon 408, by sending the "4" keypad signal 407 as seen at FIG. 4D. The "*" key acts as the cannon trigger 409 resulting in the program computer's software displaying a cannon shot 410 as seen at FIG. 4E. With keypad signals, the user may elevate the cannon's next shot 413 by sending the "1" 411 and "*" 412 keypad signals in succession as shown at FIG. 4F. Repeated sending of the "#" signal by the user results in the program computer displaying a variety of currently available program options 415, so that when the user sends the "*" signal 416 may trigger the desired result or display 417 as shown at FIG. 4G.

Unlike any other directional and triggering input computer device, the invention permits a predetermined keypad interpretation protocol that may include a key to trigger "voice communications" or connection to various voice, voice processing, or voice recognition circuits. In the example shown at FIG. 4H, two users are onscreen simultaneously and when a user sends the "0" keypad signal 418, the protocol conversion system temporarily switches the users to a voice teleconferencing bridge circuit permitting them to talk to each other over the telephone and video network connection 419 as appropriate for the particular application.

Most keyboards provide some form of exit or escape key to signal the computer that the user desires to leave the current program or to branch to another. The invention may accommodate that convention by including that triggering function in the protocol such as "9" 420 resulting in the user exiting the current program computer program and returning to a starting point 421 as shown at FIG. 4I.

FIGS. 5 A through F illustrate operation of the system to provide an audience with interactive control of a video camera associated with a televised broadcast. The user would have selected the appropriate video channel 501 and established a telephone connection to the protocol conversion system in the normal fashion 502 as shown at FIG. 5A. The user is informed of the appropriate telephone keypad signalling interpretation protocol 504 (FIG. 1D) and the broadcaster has selected the audience controlled video camera 122 source signal 123 for network distribution 503 as seen at FIG. 5B.

Referring to FIG. 5C, the user may send the "4" and "1" keypad signals 505 that may be interpreted by the protocol converter as "PAN Left" and "ZOOM In" data commands respectively to be sent to the program computer or microcomputer device, which in turn, sends the associated data signals 120 to a stationary or mobile robotic system 121 or remote control apparatus controlling the video camera 122 (FIG. 1). In this example, most actions may be independent of each other where part of the audience may be choosing to pan left while another part of the audience may be choosing to zoom in resulting in a collective new video image 506 combining the actions. As in previous examples, where the audience was controlling an onscreen pointer, a graphic of a view finder framing border 507 or crosshairs may be generated by the program computer to assist the audience in targeting the video camera as shown at FIG. 5D. As the user sends the "6" and "2" keypad signals 508, the protocol converter interprets these signals per the predetermined interpretation protocol as "PAN Right" and PAN Up" data commands respectively. These are sent to the program computer which then passes on to the robotic camera system the appropriate signals resulting in a new video image 509. In the same fashion, sending the "3" 510 and "8" 511 signals would cause the camera to zoom out and pan down 512 as shown at FIG. 5E.

In this example, ongoing audience polling to questions or situations 513 may be performed by the users sending the "*" ("thumbs up") or "#"("thumbs down") keypad signals as desired. A majority user response of "*" signals 514 as interpreted and analyzed by the protocol converter as a "thumbs-up" would result in the onscreen graphic 515 being generated by the computer as shown at FIG. 5F.

For the most part, the examples shown in FIGS. 2, 3, 4 and 5 describe the invention from the perspective of a single or few users at a time. However, for multiple and large numbers of simultaneous users, accommodations may be made by the protocol conversion system. The program computer and the protocol converter's software may be designed with these numbers of simultaneous users in mind. This may be accomplished by such methods as generating and tracking multiple user pointers or sprites that are distinguished for the users by such identifying means as color coding, different shapes, objects, symbols or other representations, assigning unique alphanumeric codes, names, or even telephone directory, area code, or local exchange number identifiers for the user or user group pointers and sprites.

The protocol converter, when handling multiple users for a single and collective set of data input commands may merely perform a statistical analysis function within its software to assimilate, summarize, or consolidate the various signals received. The protocol converter may contain algorithms that analyze the responses from a number of users to determine for example, the first signal received, the most popular signal received, sufficient numbers of common response or consensus percentage reached, etc. The algorithm may assign a particular user or group as a leader for certain triggering commands and determine a common group or team response for other commands. The overall effect with respect to a user group control of a single pointer or sprite may be one analogous to a Ouija board effect in terms of displaying onscreen directional movement and actions.

While the invention has been described in terms of a preferred embodiment, those skilled in the art will recognize that the technique employed may be modified and used without departing from the scope of the invention. For example, the system and method as illustrated may be employed in hard-wired logic or microprocessor designs on a single circuit board interfacing with a single telephone network line connection and video channel or be employed in very large multi-line varieties using mini- or mainframe computer systems providing multiple visual output signals. Likewise, the video transmitter may equally represent a nationwide television broadcast or a single low bandwidth compressed video transmission. Additionally, the video network itself may be digital data transmissions converted to visual display signals at the receiver. One skilled in the art will also recognize that strings of multiple keypad signalling events taken in series, particularly when being generated by a device complementing this invention, may be incorporated into a protocol interpreting complex computer inputs such as ASCII character sets and other data standards.

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

I claim:

1. An interactive television and telecomputer system comprising:
   (a) at least one user installation including a telephone station with DTMF keyboard means for controlling movement of a pointer on a video display means, and telephone station being co-located with a video receiving and displaying means, said DTMF keyboard means being configured to output signals indicative of pointer movement along an x-axis, a y-axis and at least two axes diagonal to said x and y axes using a dual element set (DES) protocol;
   (b) DTMF protocol conversion means for converting said DES protocol, said DTMF protocol conversion means being remotely located from said user installation and connected thereto through a switched telecommunications network (STN);
   (c) a graphic user interface (GUI) program computer means for generating real time continuous audiovisual data output resulting from user interaction from said GUI program computer means via said keyboard means and said DTMF protocol conversion means;
   (d) video encoding means for encoding the output of said GUI program computer means into video signals;
   (e) transmission means for transmitting said video signals over at least one channel of a video transmission system (VTS) in real time to said video receiving and displaying means at said user installation.

2. The interactive television and telecomputer system of claim 1, wherein said DTMF keyboard means consists solely of a 3×4 telephone keypad.

3. The interactive television and telecomputer system of claim 2, further comprising trigger means for initiating voice communication between said user installation and a second STN connection.

4. The interactive television and telecomputer system of claim 1, wherein said video receiving and displaying means consists of a video receiver not dedicated to interactive use.

5. The interactive television and telecomputer system of claim 1, further comprising multiple user installation connected to said DTMF protocol conversion means through said STN.

6. The interactive television and telecomputer system of claim 5, further comprising multiple DTMF protocol conversion means connected to said multiple user installations through said STN.

7. The interactive television and telecomputer system of claim 6, further comprising multiple GUI program computer means connected to said multiple DTMF protocol conversion means.

8. The interactive television and telecomputer system of claim 7, wherein said video transmission system comprising a plurality of channels.

9. The interactive television and telecomputer system of claim 7, wherein said GUI program computer means generate multiple pointers.

10. The interactive television and telecomputer system of claim 9, wherein said multiple pointers are of different types.

11. The interactive television and telecomputer system of claim 5, wherein pointer movement is based upon information from multiple users as determined by statistical analysis.

12. The interactive television and telecomputer system of claim 1, said transmission means further comprises addressable broadcast means for providing pay-per-view capability to said user installation.

13. An interactive television and telecomputer system comprising:
(a) at least one user installation including a telephone station with DTMF keyboard means for controlling movement of a pointer on a video display means, said telephone station being co-located with a video receiving and displaying means, said DTMF keyboard means being configured to output signals indicative of pointer movement and to output trigger signals indicative of command functions using dual element set (DES) protocol;
(b) DTMF protocol conversion means for converting said DES protocol; said DTMF protocol conversion means being remotely located from said user station and connected thereto through a switched telecommunication network (STN), said DTMF protocol conversion means further comprising means for storing a previously received trigger signal from said keyboard means to simulate simultaneous receipt of both directional information and command information;
(c) a graphic user interface (GUI) program computer means for generating real time continuous audiovisual data output resulting from user interaction with said GUI program computer means via said DTMF keyboard means and said DTMF protocol conversion means;
(d) video encoding means for encoding the output of said GUI program computer means into video signals;
(e) transmission means for transmitting said video signals over at least one channel of a video transmission system in real time to said video receiving and displaying means at said user installation.

14. The interactive television and telecomputer system of claim 13, further comprising trigger means for initiating voice communication between said user installation and a second connection.

15. The interactive television and telecomputer system of claim 13, wherein said DTMF keyboard means consists solely of a 3×4 telephone keypad.

16. The interactive television and telecomputer system of claim 13, wherein said video receiving and displaying means consists of a video receiver not dedicated to interactive use.

17. An interactive television and telecomputer system comprising:
(a) at least one user installation including a telephone station with DTMF keyboard means for controlling movement of a pointer on a video display means, said telephone station being co-located with a video receiving and displaying means, said DTMF keyboard means being configured to output signals indicative of pointer movement and to output trigger signals indicative of command functions using dual element set (DES) protocol;
(b) DTMF protocol conversion means for converting said DES protocol, said DTMF protocol conversion means being remotely located from said user station and connected thereto through a switched telecommunications network (STN);
(c) a graphic user interface (GUI) program computer means for generating real time continuous audiovisual data output resulting from user interaction with said GUI program computer means via said keyboard means and said DTMF protocol conversion means;
(d) video encoding means for encoding the output of said GUI program computer means into video signals, said video encoding means further comprising genlocking means for overlaying a first video image generated in response to said output signals from said DTMF keyboard means onto a second video image;
(e) transmission means for transmitting video signals representative of said overload first and second video images over at least one channel of a video transmission system in real time to said video receiving and displaying means at said user installation.

18. The interactive television and telecomputer system of claim 17, wherein said DTMF keyboard means consists solely of a 3×4 telephone keypad.

19. The interactive television and telecomputer system of claim 18, wherein said 3×4 telephone keypad output signal is indicative of pointer movement along an x-axis, a y-axis, and at least two axes diagonal to said x and y axes.

20. The interactive television and telecomputer system of claim 18, further comprising trigger means for initiating voice communication between said user installation and a second STN connection.

21. The interactive television and telecomputer system of claim 17, wherein said video receiving and displaying means consists of a video receiver not dedicated to interactive use.

22. The interactive television and telecomputer system of claim 17, further comprising multiple user installations.

23. The interactive television and telecomputer system of claim 22, further comprising multiple DTMF protocol conversion means.

24. The interactive television and telecomputer system of claim 23, further comprising multiple GUI program computer means.

25. The interactive television and telecomputer system of claim 24, wherein said video transmission system comprises a plurality of channels.

26. The interactive television and telecomputer system of claim 22, wherein said GUI program computer means generate multiple pointers.

27. The interactive television and telecomputer system of claim 26, wherein said multiple pointers are of different types.

28. The interactive television and telecomputer system of claim 22, wherein pointer movement is based on data from said multiple users as determined by statistical analysis.

29. The interactive television and telecomputer system of claim 17, wherein said video transmission system comprises addressable broadcast means for providing pay-per-view capability to said multiple user installations.

30. A method of operating an interactive television and telecomputer system, wherein said system includes a user installation having a telephone station with DTMF keyboard means and video display means, DTMF protocol conversion means located separately from said user installation and connected thereto through a switched telecommunication network (STN), graphic user interface (GUI) program computer means for generating real time audiovisual data output, video encoding means for encoding the output of said GUI program computer means into video signals, and transmission means for transmitting said video signals over at least one channel of a video transmission system in real time to said video receiving and displaying means at said user installation, said method comprising the following steps:

(a) using said DTMF keyboard means to generate output signals indicative of pointer movement along an x-axis, a y-axis and at least two axes diagonal to said x and y axes;

(b) sending said output signals from said DTMF keyboard means to a DTMF protocol conversion means through said STN;

(c) converting said output signals from said keyboard means to a dual element set (DES) protocol compatible with a GUI format;

(d) generating real time continuous audiovisual data output from said GUI program computer based upon an output from said protocol converter;

(e) mixing said output of said GUI program computer means in said video encoding means with signals from at least one other video source;

(f) transmitting said output of said video encoder over a video transmission system to said video receiving and displaying means at said user installation.

31. The method of operating an interactive television and telecomputer system of claim 30, further comprising the steps of:

(g) sending a command signal from said keyboard means to request a menu display to be transmitted to said video receiving and displaying means;

(h) operating said keyboard means to move a pointer over said menu;

(i) sending a command signal from said keyboard means to select from said menu according to pointer position.

* * * * *

UNITED STATES PATENT AND TRADEMARK OFFICE
CERTIFICATE OF CORRECTION

PATENT NO. : 5,236,199
DATED : August 17, 1993
INVENTOR(S) : John W. THOMPSON, Jr.

It is certified that error appears in the above-indentified patent and that said Letters Patent is hereby corrected as shown below:

```
Column 10, line 17, change "and" to --said--;
Column 10, line 32, change "from" to --with--;
Column 10, line 55, change "installation" to --installations--.
Column 11, line 25, after "using" insert --a--.
Column 12, line 2, after "using" insert --a--;
Column 12, line 22, change "overload" to --overlaid--.
```

Signed and Sealed this

Twenty-ninth Day of March, 1994

Attest:

BRUCE LEHMAN

Attesting Officer

Commissioner of Patents and Trademarks